AM PHASE-MODULATED POLYBINARY DATA TRANSMISSION SYSTEM

Filed Feb. 13, 1964 2 Sheets-Sheet 1

INVENTOR.
ADAM LENDER
BY
Lippincott, Ralls & Hendricson
ATTORNEYS

July 9, 1968 A. LENDER 3,392,238

AM PHASE-MODULATED POLYBINARY DATA TRANSMISSION SYSTEM

Filed Feb. 13, 1964 2 Sheets-Sheet 2

INVENTOR.
ADAM LENDER
BY
Lippincott, Ralls & Hendricson
ATTORNEYS

United States Patent Office 3,392,238

Patented July 9, 1968

3,392,238

AM PHASE-MODULATED POLYBINARY DATA TRANSMISSION SYSTEM

Adam Lender, Palo Alto, Calif., assignor, by mesne assignments, to Automatic Electric Laboratories, Inc., Northlake, Ill., a corporation of Delaware Filed Feb. 13, 1964, Ser. No. 344,605
5 Claims. (Cl. 178—67)

ABSTRACT OF THE DISCLOSURE

The invention disclosed and claimed herein is a method and apparatus for data transmission. Particularly, the invention is directed to transmitting of binary data by converting the binary waveform into a phase-modulated polybinary waveform. This is herein accomplished by the addition of a predetermined number of successive binary pulses, or bits, to produce an output having first and second levels determined by the number of ones and zeros in such predetermined number and the phase modulation of such output by a carrier so as to produce two phases in the carrier signal differing by 180°. The phase-modulated carrier is then passed through a filter of limited bandwidth so as to produce a multilevel signal for transmission.

The multiple-level wave, or polybinary waveform, may have $b$ number of signalling levels, however, the phase-modulated waveform has only $(b+1)/2$ amplitude levels, so that there is hereby accomplished a bandwidth compression by a factor $(b-1)$ relative to binary-amplitude modulated systems.

Decoding of transmitted signals formed in accordance with the present invention may be accomplished in a variety of ways, such as, for example, fullwave rectification, filtering and subsequent further rectification. Significant and necessary limitations upon binary to polybinary conversion and phase modulation of polybinary waveforms, in accordance herewith, are set forth in detail in connection with the following preferred embodiments of the present invention.

This invention relates to a method of transmitting binary data by converting same to a phase-modulated polybinary waveform. More particularly, the invention relates to the use of a combination of polybinary conversion, as described in copending application Ser. No. 338,445, filed Jan. 17, 1964, of the same inventor and assignee, and now U.S. Patent No. 3,337,863 and phase-modulated carrier transmission in order to achieve a highly desirable data transmission system capable of transmitting relatively large amounts of data over a small bandwidth.

In the past, the only comparable system to the system of this invention was a straight binary amplitude-modulated transmission system well known as "ON-OFF AM." Using such a system, the binary data was amplitude-modulated with a carrier and transmitted. Comparing the system of this invention with conventional binary AM systems, it has been discovered that with the system of this invention, the bandwidth is compressed by a factor $(b-1)$ relative to binary AM systems, wherein $b$ is the number of signalling levels (amplitudes) in the polybinary waveform. The AM phase-modulated waveform has only $(b+1)/2$ amplitude levels. For example, with five signalling levels, the system of this invention uses only three carrier amplitude states, and requires only one-fourth the bandwidth of conventional AM systems. In other words, a five-level polybinary AM phase-modulated system of this invention has four times the bit capacity of a conventional binary AM transmission system.

The system of this invention should not be confused with conventional AM phase shift key (PSK) multilevel systems. In such systems, all states must be distinguished at the receiver. For example, with such a conventional multilevel system with four binary channels and sixteen states, two separate detectors are required to recover two amplitude levels and eight phases, for a total of sixteen possible conditions. On the other hand, with the system of this invention, four binary channels may be accommodated with only three amplitude levels. The specifics of how this is accomplished will be discussed later.

In understanding the present invention, it is important to clearly distinguish between conventional multilevel systems or waveforms and polybinary systems or waveforms. In this respect, it is first noted that a binary pulse train is to be operated upon and that a logical extension of binary transmission at higher speeds is in the use of multilevel techniques, as postulated by Nyquist in 1924. Conversion of a binary pulse train to a multilevel waveform is accomplished by employing groups of binary digits to represent separate signal levels. Thus, a four-level waveform has each level thereof representing a different combination of two binary digits, and there is no correlation between levels. On the other hand, polybinary waveforms have each level representing one and only one binary digit of the original binary pulse train, i.e., MARK or SPACE. This is accomplished in polybinary by correlation to establish a relation between successive levels. The first step in polybinary transformation is conversion of an ordinary binary sequence into another, or second, binary sequence wherein each group of $(b-1)$ digits in the new sequence represents one original binary state, if it includes an odd number of binary ones, and otherwise it represents the other state. Note here that $b$ is the number of signal levels present in the ultimate polybinary waveform, and with the levels numbered from zero to $(b-1)$ the correlation span is $(b-1)$. The second step is the conversion of this second binary sequence into a level-coded sequence with $b$ levels. This is accomplished by forming the digit sum of successive groups of $(b-1)$ consecutive digits of the second binary sequence. Since only binary ones contribute to the digit sum, there will be produced an odd-numbered level if the number of ones in a group of $(b-1)$ digits is odd. Thus, an odd-numbered level corresponds to or represents one state of the original binary sequence such as a MARK, and an even-numbered level represents the other state of the original binary sequence.

In my above-noted U.S. Patent No. 3,337,863 there is presented a system for polybinary conversion and decoding; however, the present invention provides an improvement thereover in phase modulation of the second binary sequence with a carrier and transformation of same to polybinary by filtering. In accordance with the present invention, the phase modulation is accomplished as an intermediate step, so that the resultant polybinary waveforms herein do not resemble those of my above-noted patent.

As a résumé of "polybinary," it is noted that this term is herein employed to define a waveform having a plurality of $b$-signalling levels, and is derived from a binary signal of two signalling levels. In the present application of this term, the polybinary waveform has the following properties: a compression of the bandwidth required for transmission of binary information, with such compression being related to the number of signalling levels by the equation $K=b-1$ wherein K is equal to the number of binary channels; each level of the polybinary wave unambiguously represents one of the two binary states of the original binary wave, with these levels being numbered to start from zero at the bottom level up to $(b-1)$ for the top level with a total of $b$ levels; changes between levels of the polybinary wave may only occur between adjacent levels; and the total number of levels in the polybinary wave represented by the parameter $b$ must be an odd integer greater than one.

Briefly, the apparatus for transmitting binary data by converting such data into a phase-modulated polybinary waveform comprises the following:

(a) A means for combining the present binary pulse with the binary output pulses generated in the previous $(b-2)$ combinations effected in the combining means, where $b$ is an odd integer greater than three, and providing a binary output pulse of one polarity if the number of binary ones in the combination is even, and of the opposite polarity if the number of binary ones in the combination is odd;

(b) A means for phase modulating the binary output pulses from the combining means with a two-phase carrier, the two phases of the carrier differing by 180°; and (c) A filtering means for converting the phase-modulated waveform into a phase-modulated polybinary waveform.

In order to reconvert the transmitted phase-modulated polybinary waveform into a binary waveform at the receiver, an envelope detector is employed for separating the envelope containing the polybinary waveform from the carrier of the phase-modulated waveform. The output signal from the envelope detector is a polybinary waveform of $$\frac{b-1}{2}$$

less amplitude levels than it would be the case for a polybinary waveform, as described in the above-mentioned copending application. Conversely, if a polybinary waveform had $b$ amplitude levels, the phase-modulated waveform would have only $$\frac{b+1}{2}$$

amplitude levels. The output polybinary waveform from the envelope detector is then directly converted to the transmitted binary waveform, using full-wave rectifiers, slicers, or a combination thereof, as will be fully described later. The system of this invention is useful for transmitting polybinary waveforms having an odd number of levels (where $b$ is an odd integer).

The details of this invention will be better understood from the following description, making reference to the drawings in which.

Figure 1:
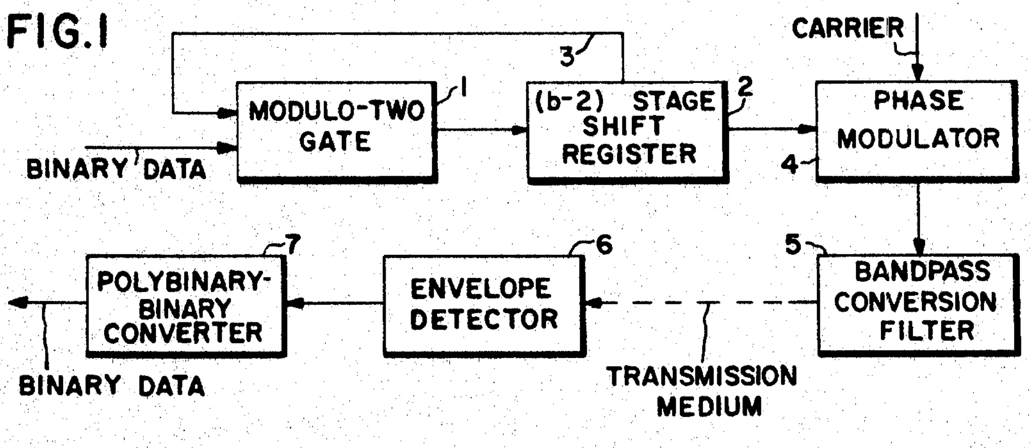
FIG. 1 is a block diagram of the phase-modulated polybinary data transmission system of this invention.

Referring to FIG. 1 the apparatus of this invention for transmitting binary digital signals by converting them into polybinary phase-modulated waveforms includes a combining means, such as modulo-two gate 1. Gate 1 combines the present binary pulse with the binary output pulses generated in the previous $(b-2)$ combinations effected in said combining means, where $b$ is an odd integer greater than three. Gate 1 provides a binary output pulse of one polarity if the number of binary ones in the combination is even, and of the opposite polarity if the number of binary ones in the combination is odd. For example, if the number of binary ones is odd, a binary one output pulse may be provided. If the number of binary ones is even, a binary zero output pulse may be provided. In other words, gate 1 makes strictly binary decisions. If the number of binary ones at its input, received both from the binary data input and from $(b-2)$-stage shift register 2, is even, gate 1 has no output pulse (binary zero); if odd, it has a positive output pulse (binary one). The input to gate 1 from a conventional clock pulse generator (not shown) insures that the binary data enters the modulo-two gate in a synchronized manner.

The combining means also includes a $(b-2)$-stage shift register 2. This shift register serves as a remembering means for remembering $(b-2)$ successive output pulses from modulo-two gate 1. The input of shift register 2 is connected to the output of modulo-two gate 1. Each stage of the shift register is connected to the input of modulo-two gate 1 through line 3. A $(b-2)$-stage shift register is a piece of apparatus well known in the art. The shift register provides a signal from each stage through line 3 denoting whether that stage contains a zero or a one. The shift register is generally made up of a series of flip-flops, as will be shown in more detail later. Thus, the shift register 2 and the gate 1 together make up a combining means which combine the binary data in a fashion in which it may be phase-modulated.

The output binary waveform from the last stage of the shift register 2 is passed to phase modulator 4. Phase modulator 4 is a conventional two-phase modulator which is capable of modulating the binary waveform emergent from shift register 2. Phase modulator 4 may use a square wave carrier, or a sinusoidal wave carrier, as desired. It is not necessary that the connection of the phase modulator be to the last stage of shift register 2. In the alternative, this connection may be made to any other stage of shift register 2, or directly to the output of modulo-two gate 1. The data coming from any stage of shift register 2, or from the output of modulo-two gate 1 itself, is the same data, shifted only in phase. Phase modulator 4 is of the phase shift key (PSK) type. The carrier is either a sinusoidal wave or a square wave. The square wave has two possible phases. One phase is modulated with the binary data of one polarity, and the opposite phase with the binary data of the opposite polarity. Similarly, where a sinusoidal wave carrier is employed, a sine wave of one particular phase, for example zero degrees, is modulated with the binary pulses of one polarity, and another phase 180° separate from the first phase, for example, 180°, is modulated with the binary pulses of the opposite polarity. Accordingly, the term "phase shift key" relates to a key used to shift the phase from one phase to the opposite phase in response to binary pulses from shift register 2 of one polarity or the opposite polarity, respectively.

The binary phase-modulated waveform from phase modulator 4 is passed to bandpass conversion filter 5. This filter performs both the polybinary conversion and shaping. The output of filter 5, therefore, is a polybinary, phase-modulated waveform used for transmission according to this invention. The bandpass conversion filter approximates the conversion of the phase-modulated signal from modulator 4 into a polybinary phase-modulated waveform. The filter itself is a single L–C network. This network accomplishes the addition of $(b-1)$ successive digits from phase modulator 4, to achieve a single digit which is a combination of the four. Such a filter is designed according to filter design principles well established in the art. The effect of the filter on the waveform will be more easily observed in connection with a later description making reference to waveform illustrations.

The phase-modulated and converted data is then transmitted across a conventional transmission medium, as shown in FIG. 1. The data is received at a receiver which uses a conventional envelope detector 6. An envelope detector, as the name implies, detects the carrier envelope and separates that envelope from the carrier itself. The output signal from envelope detector 6 is a polybinary waveform with $$\frac{b-1}{2}$$

levels less than the transmitted polybinary phase-modulated waveform. For example, in a five-level system, a three-level waveform will appear from envelope detector 6. In this example, the waveform from envelope detector 6 will not, therefore, be a polybinary waveform, for a polybinary waveform has at least five levels.

From envelope detector 6, the waveform is passed to a polybinary-binary converter 7. This converter may take the form of one or more full-wave rectifiers, sometimes in combination with one or more conventional binary slicers, or may be a plurality of slicers, one for each level of the waveform emergent from envelope detector 6. Converter 7 then converts the waveform from detector 6 into a binary waveform. This binary waveform is an exact duplicate of the binary data fed into modulo-two gate 1 in the transmitted portion of the system.

Figure 2:
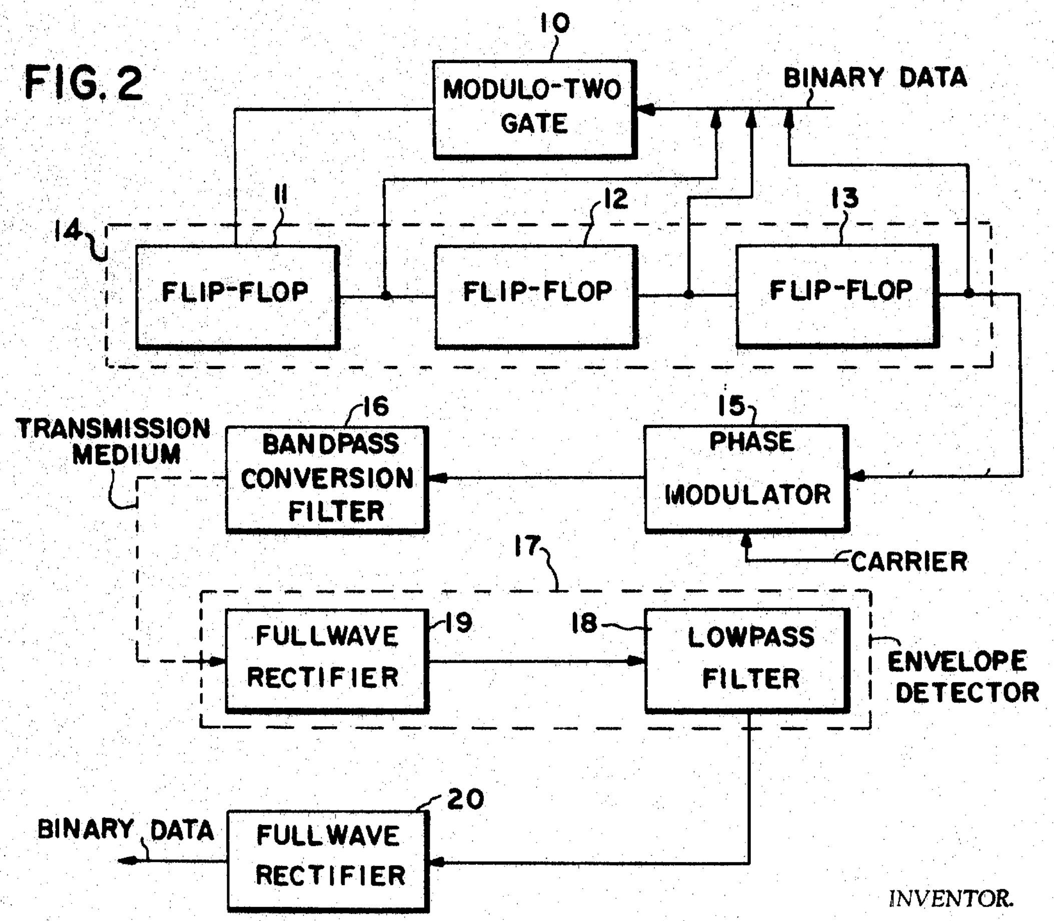
FIG. 2 is a block diagram of a polybinary phase-modulated data transmission of a preferred embodiment of this invention.

In somewhat more detail, referring to FIG. 2, a preferred embodiment of the apparatus useful in this invention is described. The apparatus in FIG. 2 is adapted for a five-level system ($b=5$). The binary data is passed into modulo-two gate 10, in the same manner as before. Flip-flops 11, 12, and 13 make up shift register 14. This shift register 14, along with modulo-two gate 10, comprise the combining means of this invention. Note that flip-flops 11, 12 and 13 are cascaded, in the conventional manner, to make up a shift register. The output of modulo-two gate 10 is connected to the input of flip-flop 11; the output of flip-flop 11 is connected to the input of flip-flop 12; and the output of flip-flop 12 is connected to the input of flip-flop 13. The outputs of each of the three flip-flops is connected back to the input of modulo-two gate 10. Thus, these flip-flops together with modulo-two gate 10 make up the combining means of the invention.

The output from the combining means of the illustrated embodiments is at the output of flip-flop 13. However, this output could just as well have been taken from the output of either of the other two flip-flops, or from the output of modulo-two gate 10. Only the phase of the signal would change, but its characteristics and waveform shape would otherwise remain unaltered.

The output from the combining means is passed to phase modulator 15, as shown. This phase modulator is the same as phase modulator 4, described previously. The output from phase modulator 15 is passed to bandpass conversion filter 16. This conversion filter has also been previously described. From the conversion filter comes the phase-modulated polybinary signal to be transmitted.

A receiver, including envelope detector 17, picks up the transmitted waveform. Envelope detector 17, in the preferred embodiment of FIG. 2, is made up of a low pass filter 18 and a full-wave rectifier 19. These two components of envelope detector 17 combine to separate the envelopes containing the polybinary waveform from the carrier. The waveform emergent from envelope detector 17 is a modified polybinary waveform of two less levels than a polybinary waveform. In the particular instance illustrated in FIG. 2, wherein $b=5$, the waveform coming from detector 17 is not a polybinary waveform, for it has only three signalling levels instead of the required five. This waveform is passed to full-wave rectifier 20 where it is directly converted into a binary waveform which corresponds to the input binary data.

Wherever the number $$\left(\frac{b+1}{2}\right)$$

of levels of the phase-modulated waveform equals $2^n+1$, where $n$ is an integer, the polybinary-binary converter connected to the envelope detector 17 may consist of a plurality of full-wave rectifiers connected in series. No other equipment is then required. The required number of rectifiers is equal to $$\log_2\left(\frac{b+1}{2}-1\right)$$

The input of the first of these rectifiers is connected to receive the output from envelope detector 17. In the case of the embodiment of FIG. 2 where the waveform has only three levels, only a single full-wave rectifier 20 was required.

Alternatively, another embodiment of the polybinary-binary converter of this invention, applicable for all values of $$\frac{b+1}{2}$$

uses a plurality of slicers connected in parallel. A total $$\left(\frac{b+1}{2}-1\right)$$

slicers are needed for a polybinary phase-modulated waveform having $$\frac{b+1}{2}$$

possible levels. The output from the slicers is connected into another modulo-two gate followed by a single slicer. The details of such a polybinary-binary converter are not part of this invention. Accordingly, a better description of such a converter may be found in the above-referenced copending application.

Still another way of converting the polybinary waveform from detector 17 to a binary waveform uses a combination of full-wave rectifiers and slicers, each as discussed above. This method is applicable not only where $$\frac{b+1}{2}$$

equals $2^n+1$, as was the case using only full-wave rectifiers, but also when $$\frac{b+1}{2}$$

is any odd integer not equal $2^n+1$. In this instance, full-wave rectifiers are used for the conversion until the number of remaining levels is reduced to an even number. Then slicers are employed for the remainder of the conversion in the same manner discussed above.

Figure 3:
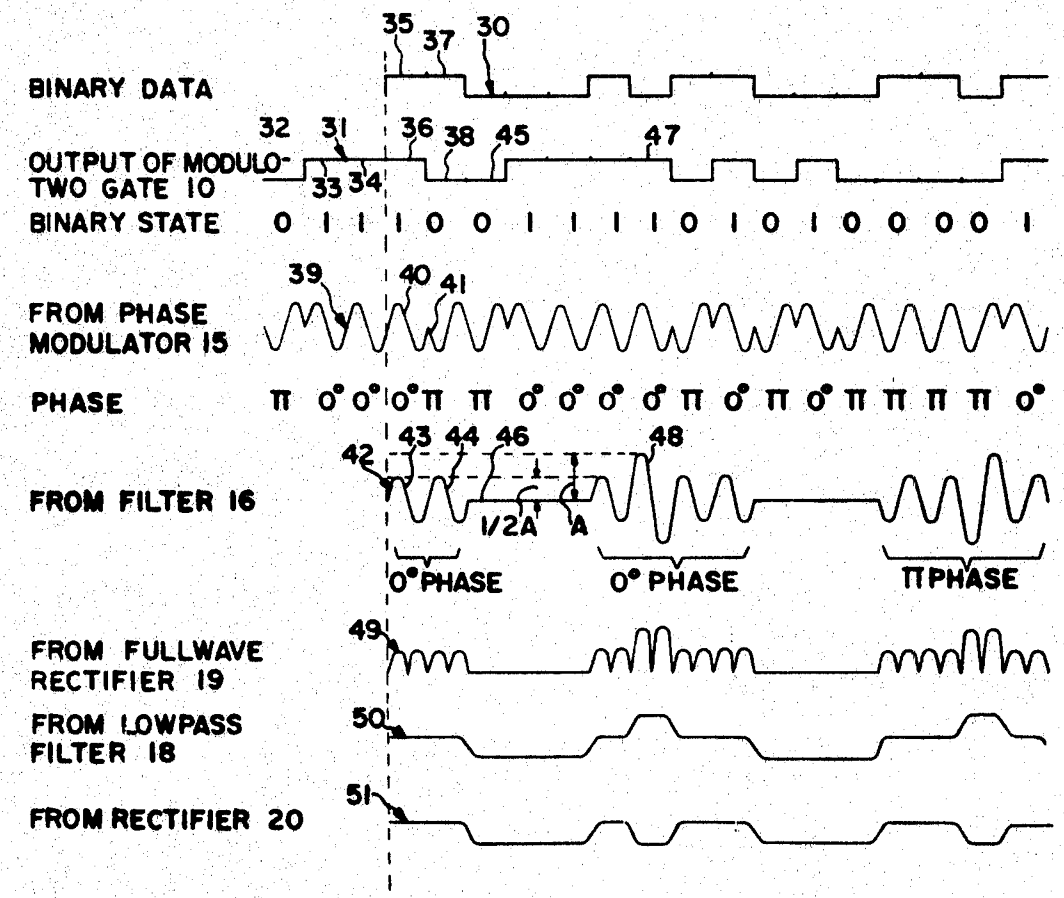
FIG. 3 is a graph showing the waveforms generated in the apparatus shown in FIG. 2.

The operation of the apparatus of FIG. 2 can best be understood from reference to the waveform shown in FIG. 3. Waveform 30 shows the input binary data. Waveform 31 shows the output from the modulo-two gate 10. Waveform 31 is obtained from waveform 30 by modulo-two combination. The previous three output pulses from modulo-two gate 10 are combined with the input binary pulse. The three previous pulses from modulo-two gate 10 are pulse 32, pulse 33, and pulse 34. Two of these are positive and the other negative. The input binary pulse 35 is also positive. The total of three positive pulses (an odd number) generates a positive output pulse from modulo-two gate 10, shown as pulse 36.

The next binary input pulse is positive pulse 37. The three previous pulses from modulo-two gate 10 (pulses 33, 34, and 36) were all positive. These three positive pulses combined with positive input binary pulse 37 make four positive pulses (an even number), generating a zero output pulse from gate 10, shown as pulse 38. In exactly the same way, the remainder of the pulses on waveform 31 were generated from the binary input pulses of waveform 30.

In the waveforms of FIG. 3, the output pulses from modulo-two gate 10 were passed directly to phase modulator 15. Phase modulator 15 used a sinuosoidal wave carrier with phase 0 and $\pi$. The 0° phase was used to correspond with a binary one output pulse from modulo-two gate 10; the $\pi$ phase was used to correspond with a binary zero output pulse from modulo-two gate 10. Note how the phase-modulated waveform 39 changes phase between cycle 40, corresponding to positive pulse 36 in waveform 31, and cycle 41. The phase change between cycle 40 and cycle 41 corresponds to the polarity change between pulses 36 and 38. The remainder of waveform 39 was generated from waveform 31 in exactly the same manner, a phase change in waveform 39 corresponding to a polarity change in waveform 31.

Waveform 39 was then passed through bandpass conversion filter 16. Filter 16 does in an analog way, using L–C filters, what an arithmetic adder accomplishes in a binary-polybinary converter described in the above-referenced copending application. Filter 16 adds four successive cycles of phase-modulated waveform 39 coming from phase modulator 15. The addition of four successive cycles usually the prior four cycles, produces each succeeding cycle of the waveform from filter 16. In the illustrated embodiment of FIG. 3, a binary one from modulo-two gate 10 is modulated with a sine wave of phase 0°; a zero is modulated with a sine wave of $\pi$. If the previous four pulses from modulo-two gate 10, which have been modulated with sine waves as shown in waveform 39, were all ones, the amplitude of the waveform emergent from filter 16 would be the maximum possible amplitude in phase 0° (which corresponds to a binary one from modulo-two gate 10). Since four ones is the maximum number of one possible from the four previous cycles, the maximum amplitude results. Analogously, with four successive zeros, a maximum amplitude also results, but in phase $\pi$ consistent with zeros from gate 10. If the previous four pulse from modulo-two gate 10 were three ones and one zero, the ones predominate, resulting in a 0° phase, but at one-half the maximum amplitude. Conversely, if the four successive pulses were three zeros and one one, the zeros predominate, resulting in a phase of $\pi$ at one-half the maximum amplitude. In the event the previous pulses were two zeros and two ones, the amplitude of the waveform from filter 16 is zero.

Looking at the particular pulses, note that the first four pulses of waveform 31 (pulses 32, 33, 34, and 36) were one zero and three ones. According to the above principles, three ones and one zero result in phase 0° at one-half the maximum amplitude. Note on waveform 42, the waveform emergent from filter 16, that pulse 43 is in phase 0° at amplitude ½A (where amplitude A is the maximum amplitude). Pulse 38 from modulo-two gate 10 was a binary zero, having as its three predecessors three binary ones. This makes a total of three ones and one zero, predominately ones, resulting in phase 0° at one-half the maximum amplitude A. Cycle 44 is 0° phase at amplitude ½A.

Pulse 45 on waveform 31 was a binary zero having as its predecessors two ones and one zero. This makes a total of two ones and two zeros, resulting in a pulse from filter 16 of zero amplitude, shown as pulse 46. Referring to pulse 47 on waveform 31, it and its three predecessors were all binary ones. Four ones result in the maximum amplitude A in phase 0°, shown as pulse 48 in waveform 42. The remainder of waveform 42 is generated in exactly the same way.

Full-wave rectifier 19 inverts the lower half of waveform 42, as is well known in the art, to produce waveform 49. Full-wave rectifier 19 and low pass filter 18 together make an envelope detector. The output of low pass filter 18, and accordingly the output of envelope detector 17, is shown in waveform 50. Waveform 50 represents only the envelope of waveform 49, as is well known in the art. Note that waveform 50 could be obtained by drawing a curve (or "envelope") across the tops of the cycles of waveform 49.

Waveform 50 from envelope detector 17 is passed to full-wave rectifier 20. The output of rectifier 20 is shown as waveform 51. This waveform corresponds exactly to the original binary data waveform 30. Waveform 51 may be squared, if desired, by passing the waveform through a single slicer, as is known in the art. Waveform 51 will then become an exact duplicate of waveform 30. Thus, the completed conversion, transmission, and reconversion process, using a phase-modulated polybinary waveform for transmission, has been achieved.

All of the individual circuit components, such as flip-flops, filters, AND-gates, modulo-two gates, slicers, conversion filters, and so on, are well known in the art. Other combinations of such components may be used to achieve the same results as the particular choice of components chosen for illustration above. However, the particular selected embodiments are merely representative, and are not intended to limit the scope of the invention. Therefore, the only limitations to be placed upon the scope are those expressly stated in the claims which follow.

What is claimed is:

1. Apparatus for transmitting binary data by converting such data into a phase-modulated polybinary waveform, which apparatus comprises:

(a) a means for combining the present binary pulse with the binary output pulses generated in the previous ($b-2$) combinations effected in said combining means, where $b$ is an odd integer greater than three, and providing a binary output pulse of one polarity if the number of binary ones in said combination is even, and of the opposite polarity if the number of binary ones in said combination is odd;

(b) a means for phase-modulating the binary output pulses from said combining means with a two phase carrier, the two phases of said carrier differing by 180°; and (c) a filtering means for converting the phase-modulated waveform into a phase-modulated polybinary waveform.

2. Apparatus for transmitting and receiving binary data by converting such data into a phase-modulated polybinary waveform, which apparatus comprises:

(a) a combining means for combining the present binary pulse with the binary output pulses generated in the previous ($b-2$) combinations effected in said combining means, where $b$ is an odd integer greater than three, and providing a binary output pulse of one polarity if the number of binary ones in said combination is even, and of the opposite polarity if the number of binary ones in said combination is odd;

(b) phase modulating means for phase modulating the binary output waveform from said combining means with a two phase carrier, the two phases of said carrier differing by 180°;

(c) filtering means for converting the phase-modulated waveform into a phase-modulated polybinary waveform;

(d) an envelope detector for separating the envelopes containing the polybinary waveform from the carrier of said phase-modulated waveform; and (e) means for sensing each of the levels of said polybinary waveform during each pulse interval to ascertain if that level is odd-numbered or even-numbered, said even-numbered level indicating the receipt of a binary pulse of one polarity, and said odd-numbered level indicating the receipt of a binary pulse of the opposite polarity.

3. Apparatus for transmitting and receiving binary data by converting such data into a phase-modulated polybinary waveform, which apparatus comprises:

(a) a combining means for combining the present binary pulse with the binary output pulses generated in the previous ($b-2$) combinations effected in said combining means, where $b$ is an odd integer greater than three, and providing a binary output pulse of one polarity if the number of binary ones in said combination is even, and of the opposite polarity if the number of binary ones in said combination is odd;

(b) phase modulating means for phase modulating the binary output waveform from said combining means with a two phase carrier, the two phases of said carrier differing by 180°, said phase modulating means being a phase reversal modulator;

(c) filtering means for converting the phase-modulated waveform into a phase-modulated polybinary waveform;

(d) an envelope detector for separating the envelopes containing the polybinary waveform from the carrier of said phase-modulated waveform; and (e) means for sensing each of the levels of said polybinary waveform during each pulse interval to ascertain if that level is odd-numbered or even-numbered, said even-numbered level indicating the receipt of a binary pulse of one polarity, and said odd-numbered level indicating the receipt of a binary pulse of the opposite polarity.

4. Apparatus for transmitting and receiving binary data by converting such data into a phase-modulated polybinary waveform, which apparatus comprises:

(a) a combining means including a modulo-two gate for combining the present binary pulse with the binary output pulses generated in the previous ($b-2$) combinations effected in said combining means, where $b$ is an odd integer greater than three, and providing a binary output pulse of one polarity if the number of binary ones in said combination is even, and of the opposite polarity if the number of binary ones in said combination is odd;

(b) phase modulating means for phase modulating the binary output waveform from said combining means with a two phase carrier, the two phases of said carrier differing by 180°, said phase modulating means being a phase reversal modulator, said modulator using a square wave carrier;

(c) filtering means for converting the phase-modulated waveform into a phase-modulated polybinary waveform;

(d) an envelope detector for separating the envelopes containing the polybinary waveform from the carrier of said phase-modulated waveform, said envelope detector including a full-wave rectifier and a low pass filter; and (e) means for sensing each of the levels of said polybinary waveform during each pulse interval to ascertain if that level is odd-numbered or even-numbered, said even-numbered level indicating the receipt of a binary pulse of one polarity, and said odd-numbered level indicating the receipt of a binary pulse of the opposite polarity.

5. Apparatus for transmitting and receiving binary data by converting such data into a phase-modulated polybinary waveform, which apparatus comprises:

(a) a combining means including a modulo-two gate for combining the present binary pulse with the binary output pulses generated in the previous ($b-2$) combinations effected in said combining means, where $b$ is an odd integer greater than three, and providing a binary output pulse of one polarity if the number of binary ones in said combination is even, and of the opposite polarity if the number of binary ones in said combination is odd;

(b) phase modulating means for phase modulating the binary output waveform from said combining means with a two phase carrier, the two phases of said carrier differing by 180°, said phase modulating means being a phase reversal modulator, said modulator using a sinusoidal wave carrier;

(c) filtering means for converting the phase-modulated waveform into a phase-modulated polybinary waveform;

(d) an envelope detector for separating the envelopes containing the polybinary waveform from the carrier of said phase-modulated waveform, said envelope detector including a full-wave rectifier and a low pass filter; and (e) means for sensing each of the levels of said polybinary waveform during each pulse interval to ascertain if that level is odd-numbered or even-numbered, said even-numbered level indicating the receipt of a binary pulse of one polarity, and said odd-numbered level indicating the receipt of a binary pulse of the opposite polarity.

References Cited

UNITED STATES PATENTS

| | | | |
|---|---|---|---|
| 3,128,343 | 4/1964 | Baker | 178—66 X |
| 3,204,029 | 8/1965 | Groff et al. | 178—68 |
| 3,069,657 | 12/1962 | Green et al. | 325—30 X |
| 3,157,741 | 11/1964 | Bennett et al. | 178—66 |
| 3,215,779 | 11/1965 | Halm et al. | 178—67 |
| 3,223,929 | 12/1965 | Hofstad et al. | 325—320 X |

ROBERT L. GRIFFIN, *Primary Examiner.*

W. S. FROMMER, *Assistant Examiner.*